US011912467B2

(12) United States Patent
Rapparini et al.

(10) Patent No.: US 11,912,467 B2
(45) Date of Patent: Feb. 27, 2024

(54) CLOSING SYSTEM FOR PACKAGES WITH CLOSEABLE INTERLOCKING ELEMENT

(71) Applicant: ICA S.p.A, Bologna (IT)

(72) Inventors: Gino Rapparini, Bologna (IT); Pietro Crescimbeni, Bologna (IT)

(73) Assignee: ICA S.P.A., Bologna (IT)

( * ) Notice: Subject to any disclaimer, the term of this patent is extended or adjusted under 35 U.S.C. 154(b) by 0 days.

(21) Appl. No.: 17/591,067

(22) Filed: Feb. 2, 2022

(65) Prior Publication Data

US 2022/0250800 A1 Aug. 11, 2022

(30) Foreign Application Priority Data

Feb. 5, 2021 (IT) ........................ 102021000002633

(51) Int. Cl.
*B65D 33/25* (2006.01)
*B65B 1/04* (2006.01)
(Continued)

(52) U.S. Cl.
CPC ............ *B65D 33/2508* (2013.01); *B65B 1/04* (2013.01); *B65B 3/04* (2013.01); *B65B 7/02* (2013.01);
(Continued)

(58) Field of Classification Search
CPC .... B65B 1/04; B65B 3/04; B65B 7/02; B65B 7/06; B65B 51/10; B65B 51/146;
(Continued)

(56) References Cited

U.S. PATENT DOCUMENTS 420,620 A * 2/1890 Byers ..................... B43M 5/025 156/442.4
424,200 A * 3/1890 Hathaway .............. B43M 5/025 156/442.4

(Continued)

FOREIGN PATENT DOCUMENTS

| | | |
|---|---|---|
| CN | 208515902 | 2/2019 |
| DE | 2208569 | 8/1973 |
| EP | 068123 | 7/1994 |

OTHER PUBLICATIONS

3M Safety-Walk Rubber Hand Roller 903, Amazon.com, Jul. 23, 2017.*

(Continued)

*Primary Examiner* — Robert F Long
*Assistant Examiner* — Eduardo R Ferrero
(74) *Attorney, Agent, or Firm* — Fattibene and Fattibene, LLC; Paul A. Fattibene

(57) ABSTRACT

A system and a method for closing, in an automated way, at least one package having a reversibly closeable interlocking element comprising a first complementary element and a second complementary element extending between two extremities. The system includes a pressing element, configured to press the first complementary element against the second complementary element by sliding between the two extremities, and a counteracting element, configured to stop the second complementary element when the pressing element presses the first complementary element against the second complementary element, in such a way that the first complementary element and the second complementary element interlock with each other along their entire length.

14 Claims, 14 Drawing Sheets

(51) Int. Cl.

| | |
|---|---|
| ***B65B 7/02*** | (2006.01) |
| ***B65B 3/04*** | (2006.01) |
| ***B65B 51/10*** | (2006.01) |
| ***B65D 75/58*** | (2006.01) |
| ***B65B 61/18*** | (2006.01) |
| *B31B 70/00* | (2017.01) |
| *B31B 70/81* | (2017.01) |
| *B65B 51/14* | (2006.01) |

(52) U.S. Cl.
CPC ............ *B65B 51/10* (2013.01); *B65B 61/188* (2013.01); *B65D 33/25* (2013.01); *B65D 75/5855* (2013.01); *B31B 70/004* (2017.08); *B31B 70/8131* (2017.08); *B65B 51/146* (2013.01)

(58) Field of Classification Search
CPC ....... B65B 61/18; B65B 61/188; B65D 33/25; B65D 33/2508; B65D 75/58; B65D 75/5855; B65D 33/16; B31B 70/58; B31B 70/5855; B31B 70/004; B31B 70/8131; B43M 5/02; B43M 5/025
USPC ........................................ 53/375.4, 570, 390
See application file for complete search history.

(56) References Cited

U.S. PATENT DOCUMENTS 447,809 A * 3/1891 Coyle .................... B43M 5/025 156/442.4
1,333,489 A * 3/1920 Hendrickson .......... B43M 5/025 156/442.4
1,837,156 A * 12/1931 Bruce .................... B43M 5/025 156/442.4
1,846,969 A * 2/1932 Godel ...................... B43M 5/02 156/442.4
1,910,677 A * 5/1933 Bryson .................... B43M 5/02 156/442.4
1,994,395 A * 3/1935 Jones ..................... B43M 5/025 156/442.4
3,101,109 A * 8/1963 Hawley .................. A44B 19/16 150/157
3,198,228 A * 8/1965 Naito ................. B65D 33/2533 156/92
3,362,302 A * 1/1968 Friedman .......... B29C 45/14467 425/441
3,503,112 A * 3/1970 Siegel ................. B29C 66/1122 72/428
3,543,379 A * 12/1970 Naito ...................... B31B 70/00 29/450
3,613,524 A * 10/1971 Behr ................... B31B 70/8131 493/287
3,616,042 A * 10/1971 Beyer ..................... B29C 65/18 156/583.5
3,744,211 A * 7/1973 Titchenal .............. B65B 43/123 383/65
3,824,908 A * 7/1974 Rowell ..................... B65B 9/02 53/553
3,988,184 A * 10/1976 Howard .................. B31B 70/81 156/308.2
4,024,010 A * 5/1977 Boccia .................... B29C 65/02 493/203
4,169,345 A * 10/1979 Douwenga ............ B65B 43/267 53/384.1
4,199,845 A * 4/1980 Ausnit ................. A44B 19/267 24/399
4,268,938 A * 5/1981 Walchli ............. B65D 33/2541 24/DIG. 42
4,285,376 A * 8/1981 Ausnit ............... B65D 33/2525 383/203
4,490,959 A * 1/1985 Lems .................... B65B 43/123 53/469
4,514,962 A 5/1985 Ausnit ............................ 53/457
4,517,788 A * 5/1985 Scheffers .................. B65B 1/02 53/375.4
4,563,319 A * 1/1986 Ausnit ..................... B29D 5/10 493/927
4,586,319 A * 5/1986 Ausnit ............... B65D 33/2558 53/384.1
4,665,552 A * 5/1987 Lems .................... B65B 43/123 53/469
4,682,366 A * 7/1987 Ausnit ................ B29C 66/4322 24/585.12
4,727,709 A * 3/1988 Zieke ........................ B65B 9/13 53/551
4,744,196 A * 5/1988 Gallo ........................ B65B 7/06 53/375.4
4,786,190 A * 11/1988 Van Erden ............. B65D 75/20 383/203
4,832,505 A * 5/1989 Ausnit ................... B65D 33/34 383/65
4,848,064 A * 7/1989 Lems .................... B65B 43/123 53/469
4,850,178 A * 7/1989 Ausnit .................. B65B 43/267 53/139.2
4,874,257 A * 10/1989 Inagaki ................ B65B 61/188 383/95
4,876,842 A * 10/1989 Ausnit ................ B29C 66/4322 53/64
4,894,975 A * 1/1990 Ausnit ................ B29C 66/7392 53/139.2
4,945,714 A * 8/1990 Bodolay ............... B65B 61/188 53/139.2
5,065,899 A * 11/1991 Tilman ............... B65D 33/2541 24/585.12
5,140,796 A * 8/1992 Pope .................... A44B 19/285 53/390
5,179,816 A * 1/1993 Wojnicki ................ B65B 43/30 53/562
5,238,306 A * 8/1993 Heintz ............... B65D 33/2541 493/962
5,275,491 A * 1/1994 Kuge ................. B65D 33/2533 53/133.4
5,287,680 A * 2/1994 Lau ......................... B65B 31/06 53/139.2
5,412,924 A * 5/1995 Ausnit .................. B65B 61/188 53/551
5,426,830 A * 6/1995 Richardson ........ B65D 33/2587 24/399
5,519,982 A 5/1996 Herber et al. .................. 53/412
5,551,208 A * 9/1996 Van Erden ................ B65B 9/20 53/139.2
5,605,572 A * 2/1997 Berger ................... B43M 5/025 401/48
5,664,406 A * 9/1997 Smith ....................... B65B 7/06 53/469
5,722,218 A * 3/1998 Lerner .................. B65B 43/267 53/459
5,743,070 A * 4/1998 Lerner .................. B65B 43/465 53/459
5,749,658 A * 5/1998 Kettner .............. B65D 33/2541 383/65
5,833,791 A * 11/1998 Bryniarski ........... B65D 33/259 156/308.2
6,186,663 B1 * 2/2001 Ausnit ............... B65D 33/2541 24/30.5 R
6,209,287 B1 * 4/2001 Thieman ............... B65B 25/005 53/139.2
6,216,423 B1 * 4/2001 Thieman ................... B65B 9/06 53/139.2
6,350,057 B1 2/2002 Forman ........................... 383/61
6,474,045 B2 * 11/2002 McMahon ............ B65B 61/188 53/139.2
6,477,820 B1 * 11/2002 Dutra .................... B65B 61/188 53/450
6,533,711 B1 * 3/2003 Anderson .............. B65D 33/08 493/923

(56) References Cited

U.S. PATENT DOCUMENTS 6,851,248 B2 * 2/2005 Knight .................. B65B 61/188 53/139.2
6,862,866 B2 * 3/2005 Jacobsen ................. B65B 39/12 53/469
6,928,702 B1 * 8/2005 Savicki ............ B65D 33/25865 24/30.5 R
6,938,395 B2 * 9/2005 Knight .................. B65B 61/188 53/412
7,090,397 B2 * 8/2006 Stolmeier .......... B65D 33/2508 383/204
7,793,391 B2 * 9/2010 Sprehe ............... B65D 33/2508 24/585.12
7,857,515 B2 * 12/2010 Dais ................... B65D 33/2541 24/585.12
8,540,428 B2 * 9/2013 Nanba ............... B29C 66/43121 383/203
10,427,851 B2 * 10/2019 Steele ................ B65D 75/5816
2001/0038721 A1 * 11/2001 Bois ....................... B65D 31/10 383/120
2003/0079840 A1 * 5/2003 Cortigiano, Sr. ... B31B 70/8132 156/543
2003/0083181 A1 * 5/2003 Cortigiano, Sr. ....... B31B 70/00 493/394
2004/0123569 A1 * 7/2004 Jacobsen ................. B65B 39/12 53/469
2012/0186195 A1 7/2012 Moeller et al. .............. 53/373.1
2012/0314977 A1 * 12/2012 Matsuo ................... B31B 50/00 156/308.2
2015/0203250 A1 * 7/2015 Denis ..................... B65D 31/10 156/244.11
2015/0251815 A1 * 9/2015 Berger .................. B31B 70/876 156/69
2016/0318275 A1 * 11/2016 Walsh ................... B31B 70/008
2017/0197747 A1 * 7/2017 Keehner ................. B65B 67/02
2018/0022484 A1 * 1/2018 Christophel ............ B65B 43/50 53/284.7

OTHER PUBLICATIONS

Search Report from corresponding Italian Application No. 102021000002633 dated Sep. 30, 2021, with English translation; 11 pages.

* cited by examiner

CLOSING SYSTEM FOR PACKAGES WITH CLOSEABLE INTERLOCKING ELEMENT

FIELD OF THE INVENTION

The present invention relates to the field of packaging products in packages made of flexible material and provided with a closeable interlocking element.

BACKGROUND OF THE INVENTION

Various types of closeable packages used for packaging various products, for example fine dry, granular, powder or viscous products, are known at the state of the art.

In some cases, the packages are provided with a closeable interlocking element, for example a zip closure, made of a plastic material. The closeable element may be characterized by one, two, three or more interlocking tracks, or by "Velcro" type sealing straps that rely on the interlocking of relief dots for sealing.

When packaging fine dry, granular, powder or viscous products in closeable packages, it is often necessary to close the zip closure immediately after filling the package, in order to ensure that the closeable interlocking element functions correctly when the package reaches the end user. After the package has been processed, stored and transported, the end user can easily open the package, by first removing the welded top and then opening the zip closure for access to the product.

If this is not the case, that is if the package is filled, closed, stored and transported with the zip closure open, the parts of the product having finer grain size will also go inside the straps of the zip closure and prevent it from being used. In fact, the zip closure can only function properly if its straps are completely free of any impurities and can interlock with each other along their entire length, i.e. the entire width of the bag.

Generally, during the production of closeable packages provided with zip closures, the zip closure is closed by pressing the straps against each other along their entire length using two rigid bars. However, the rigid bars do not always guarantee a perfect interlocking of the plastic straps, especially in the case of very wide bags or in the case of packaging machines with two packages side by side.

Therefore, the technical problem to be solved is to develop a closing system for closing the zip closure of closeable packages in such a way as to ensure their sealing and effectiveness along the entire length.

SUMMARY OF THE INVENTION

The present invention is based on the idea of providing a closing system for packages having a closeable interlocking element, which can simulate the movement of the hand fingers that the end user performs to close again the package, after an initial use.

According to the present invention, a closing system for closing in an automated way at least one package provided with a reversibly closeable interlocking element, comprising a first complementary element and a second complementary element and having a length extending between two extremities is provided, wherein the closing system comprises a pressing element and a counteracting element and is characterized in that:

- the pressing element is configured to press the first complementary element against the second complementary element, in a progressive way, starting from a first extremity to a second extremity;
- the counteracting element is configured to counteract the pressure of the first complementary element against the second complementary element by stopping the second complementary element when the pressing element presses the first complementary element against the second complementary element, so that the first complementary element and the second complementary element interlock with each other along their entire length.

This system is particularly advantageous because it ensures that the first complementary element is interlocked with the second complementary element at every point and therefore that the reversibly closeable interlocking element is correctly closed.

For example, this closing system may be implemented in an automated machine. For example, this closing system may be implemented in a packaging machine.

For example, the reversibly closeable interlocking element may comprise a zip closure; preferably, the zip closure may be an airtight closure. The first and second complementary elements may comprise a first and a second strap of the zip closure, respectively, comprising a male element and a female element, respectively.

For example, the first and second complementary elements may each comprise one, two, three or more interlocking tracks. Preferably, the first complementary element may comprise one, two, three or more tracks that protrude from the edge of the package; the second complementary element may comprise one, two, three or more tracks that form grooves with respect to the edge of the package.

For example, the first complementary element may include a series of protrusions suitable for interlocking with corresponding recesses of the second complementary element.

The two straps of the zip closure are thus interlocked at every point if each projecting track or each projecting component of the male element of the zip closure is interlocked with the corresponding groove or corresponding recess of the female element of the zip closure, along the entire length of the zip closure.

For example, the reversibly closeable interlocking element may comprise a hook and loop closure, such as one sold under the trademark Velcro; the first complementary element may comprise a first strap of the Velcro closure comprising small hook-shaped elements, and the second complementary element may comprise a second strap of the Velcro closure comprising small loop-shaped elements. Thus, the two straps of the Velcro closure are interlocked at every point if each hook-shaped element of the first strap is inserted into the corresponding loop of the second strap.

Preferably, the first complementary element, for example a male element, is placed in contact with the pressing element and the second complementary element, for example a female element, is placed in contact with the counteracting element. However, it is clear that the first complementary element and the second complementary element are interchangeable, and thus the configuration in which the first, male complementary element is placed in contact with the counteracting element and the second, female complementary element is placed in contact with the pressing element is also possible.

In a preferred embodiment, the pressing element and the counteracting element are located on opposite sides of the outer surface of the package and are configured in such a way that, as they approach or move away from it during the using steps of the closing system, they can respectively be in contact or not in contact with the outer surface of the package. Preferably, the package is held by additional holding means during the closing process.

Preferably, both the pressing element and the counteracting element are configured to be moved close to or moved away from the package. However, it is also possible to implement a closing system in which the counteracting element is fixed and in contact with the outer surface of the package, on one side of the package, and the pressing element is placed on the other side of the package and is configured to move from an idle position, away from the package, to an operational position, close to the package.

Preferably, the pressing element is configured to press the first complementary element against the second complementary element in a progressive way starting from a first extremity to a second extremity, sliding between the two extremities. This means that, at a given time, the moveable pressing element does not apply a uniform pressure over the entire length of the first complementary element, but only presses the portion to be interlocked with the second complementary element. As a result of a reciprocal sliding motion between the pressing element and the interlocking closure of the package, each part of the first complementary element is progressively pressed into and interlocked with the second complementary element.

Preferably, the counteracting element is configured to counteract the pressure of the first complementary element against the second complementary element by stopping the second complementary element. This means that the second complementary element is not pushed away from its position by the pressure of the first complementary element, which is in turn pushed by the pressing element, because the counteracting element counteracts this force.

According to a further embodiment of the present invention, a closing system is provided, wherein the pressing element is configured to press the first complementary element against the second complementary element, by sliding from the first extremity to the second extremity.

This configuration is particularly advantageous because it is sufficient to place the pressing element in contact with the package, so that it exerts a predefined pressure on it, and then move it from one extremity to the other of the closeable interlocking closure, to complete its closing.

For example, the pressing element is a sliding pressing element that, by sliding along the first, male complementary element from a first extremity to a second extremity, applies a pressure thereon and facilitates the progressive interlocking of the protrusions of the male element with the recesses of the second, female complementary element, which in turn is stopped by the counteracting element. The counteracting element stops the second complementary element and prevents it from being pushed away from its position by the pressure exerted by the first complementary element, which is in turn pushed by the pressing element. The counteracting element thus counteracts the pressure applied by the pressing element on the first complementary element and the second complementary element and, in this way, the correct interlocking between the two complementary elements is facilitated.

It is apparent that the pressing element could also be placed in contact with the female complementary element and, by sliding on it from a first extremity to a second extremity, could apply a pressure on the female complementary element so as to facilitate the interlocking between the recesses of the female element and the protrusions of the male complementary element, which is in turn stopped by the counteracting element.

According to a further embodiment of the present invention, a closing system is provided, wherein the pressing element is configured to press the first complementary element against the second complementary element, while the first complementary element and the second complementary element are made to slide together with respect to the fixed pressing element and the fixed counteracting element.

This configuration is particularly advantageous because it makes it possible to close the interlocking closure by keeping the pressing element and the counteracting element fixed and by making the package slide, being pressed between them.

For example, the package may be held at its ends by means of holding means and may be translated from an initial position to a final position along a direction, by making the package pass through an interstice formed by the fixed pressing element and counteracting element. The pressing element is configured to apply a pressure on the first complementary element, and thus indirectly on the second complementary element, as they slide through the interstice. The second complementary element is in turn stopped by the counteracting element. In this way, as the package slides from the initial position to the final position, the reversibly closeable interlocking element is always in contact, at every point, with the pressing element, on one side of the package, and the counteracting element, on the other side of the package.

During the step of making the package slide, the first and second complementary elements of the package closure are preferably aligned with each other and are translated together from the initial position to the final position, so that each point of the first complementary element is interlocked with the corresponding point of the second complementary element, when they contact the fixed pressing element and counteracting element, respectively.

According to a further embodiment of the present invention, a closing system is provided, wherein the pressing element is configured to translate along the entire length of the reversibly closeable interlocking element both along a direction D1 and along the opposite direction D2.

This configuration is particularly advantageous because it enables the pressing element to move along the reversibly closeable interlocking element in both directions and therefore to optimize production times. In fact, after being translated along the reversibly closeable interlocking element along a direction D1, from a first to a second extremity, and hence closing the package, the pressing element remains stationary at a second extremity of the closing system, waiting to receive a new package. When the new package has been positioned in the closing system, the pressing element starts again from the position at the second extremity and, by moving along the direction D2 opposite to the previous one, it makes it possible to close the package. In this way, it is not necessary to bring the pressing element to the initial position each time after closing a package.

For example, the pressing element may be a block or sliding skid that slides by pressing the reversibly closeable interlocking element.

Preferably, the pressing element is configured to enable proper closure of the reversibly closeable interlocking element, when it slides along the direction parallel to the extension direction of the reversibly closeable interlocking element, either in one direction or in the opposite direction.

According to a further embodiment of the present invention, a closing system is provided, wherein the pressing element is configured to translate along the entire length of the reversibly closable interlocking element both along a direction D1 and along the opposite direction D2, while rotating about one of its own axis.

This configuration is particularly advantageous because the combination of the motions of translating the pressing element from one extremity of the closing system to the other and of rotating the pressing element about its own axis optimizes the pressing of the first complementary element against the second complementary element and thus facilitates the closing of the package.

Preferably, the pressing element may be a wheel, a roller or a ball bearing. For example, the counteracting element may also be a wheel, a roller or a ball bearing, respectively, so that simultaneous and progressive sliding of the two rotatable elements makes it possible to press and interlock the two complementary elements of the closable closure.

According to a further embodiment of the present invention, a closing system is provided, wherein the pressing element includes a ball bearing.

This configuration has the advantage of reducing the friction between the pressing element and the reversibly closeable interlocking element.

Preferably, the ball bearing slides on a rigid matching part, fixed or slightly flexible, along the entire length of the closable interlocking element, thereby ensuring the interlocking between the complementary elements and their sealing.

According to a further embodiment of the present invention, a closing system is provided, in which the counteracting element includes a counteracting bar.

This configuration is advantageous because the counteracting bar can be adapted to the size of the reversibly closeable interlocking element and of the package and it can stop the second complementary element while the first complementary element is pressed against it.

For example, the pressing element is configured to slide along the first complementary element while the counteracting bar stops the second complementary element. The counteracting bar may be at least as long as the length of the reversibly closeable interlocking element.

According to a further embodiment of the present invention, a closing system is provided in which the counteracting element comprises a ball bearing.

This configuration is advantageous because the counteracting element is able to slide along the reversibly closable interlocking element, while applying a pressure on the second complementary element so as to counteract the pressure applied by the pressing element on the first complementary element and, consequently, also on the second complementary element. Furthermore, the ball bearing has the advantage of reducing friction between the counteracting element and the reversibly closeable interlocking element.

According to a preferred configuration, both the pressing element and the counteracting element comprise ball bearings and are configured to simultaneously slide along the reversibly closable interlocking element, so as to simultaneously press on the same point of the reversibly closable interlocking element, respectively along the first complementary element and along the second complementary element.

According to a further embodiment of the present invention, a closing system is provided in which the counteracting element and the pressing element are placed on opposite sides outside the mouth of the package where the reversibly closeable interlocking element is placed.

This configuration is advantageous because it facilitates the interlocking between the first and second complementary elements as a result of the pressure applied by the pressing element and the resistance applied by the counteracting element.

According to a further embodiment of the present invention, a machine for producing packages having a reversibly closeable interlocking element is provided, the machine comprising a closing system according to one of the previous embodiments.

This configuration is particularly advantageous because it makes it possible to produce packages with a reversibly closeable interlocking element and to reversibly close this element during the production process.

Preferably, the machine for producing packages having a reversibly closeable interlocking element may comprise a plurality of stations, for example: a station for forming the tubular structure of the packages from a strip of flexible material; a station for applying the closeable interlocking element to the packages; a first sealing station for closing the sides and bottom of the package; a station for inserting the product in the packages, for example a granular or viscous product; and a second sealing station for irreversibly closing the free ends of the package. Preferably, the packaging machine comprises gripping means suitable for gripping the package and moving it from one working station to another during the various production steps of the package. Preferably, the gripping means are configured to hold the package during the step of closing the zip closure.

According to a preferred configuration, the closable interlocking element comprising the two complementary interlocking elements initially forms a continuous strip, which is wound on a reel. The strip of the closeable interlocking element in the closed configuration is unwound from the reel and is inserted into the tubular structure of the flexible element for the packages at the upper mouth of the package. At a later stage, two types of welding of the closable interlocking element to the tubular element are performed: a first type of welding ensures that each strap of the closable interlocking element is welded to the corresponding strap of the tubular element; a second type of welding ensures that the two opposite ends of the tubular element are welded to each other at certain points placed at regular intervals, so as to define the length of each closure of the packages. Preferably, after that the first sealing weld is made, the closeable interlocking element is partially opened, so that it is possible to subsequently insert the product, but so that the two complementary straps are aligned with each other. Finally, the tubular element is unwound and cut so as to form the single packages, which are transferred to the station of filling of the product.

Preferably, the closing system is placed immediately downstream of the product filling station. This configuration has the advantage of avoiding that, during storage and transport, parts of the product with finer grain size or viscous components go inside the straps of the reversibly closable element, thus preventing its correct subsequent use by the consumer.

For example, the machine for producing packages may be a carousel machine and the different stations may be placed one after another in a circular structure, or it may be a linear machine and the different stations may be placed one after another in a linear structure.

According to a further embodiment of the present invention, a machine for producing packages having a reversibly closeable interlocking element is provided, wherein the closing system is placed at a welding station.

This configuration is particularly advantageous, since it makes it possible to produce packages provided with a reversibly closable interlocking element and to close them in a reversible way, by closing the closable interlocking element appropriately, while the free ends of the packages are welded together, thus ensuring a better sealing of the packages. In fact, it is common that the package is opened by the end user by first removing the welded upper part and by then opening the reversibly closeable interlocking part, which can be potentially closed again. For example, the package may be provided with an easy opening to facilitate the removal of the upper welded part.

Moreover, welding the free ends of the upper edge of the package during the process of closing, in a reversible manner, the zip closure has the advantage of optimizing the production time of the packages, because it is not necessary to move the package from one station to the other to perform the two operations of welding and closing the zip closure.

In a preferred configuration, the welding bars are placed on opposite sides of the package and above the closing system, in such a way that the welding bars are at an equal height of the upper ends of the package and the closing system is at an equal height of the closeable interlocking element. For example, each welding bar and the corresponding element of the closing system placed underneath can be brought closer to and/or further away from the package according to a circular motion, by describing a circumference arc.

According to a further embodiment of the present invention, a method is provided for closing, in an automated way, at least one package provided with a reversibly closeable interlocking element comprising a first complementary element and a second complementary element and having a length extending between two extremities, characterized by pressing the first complementary element against the second complementary element, in a progressive way, starting from the first extremity to the second extremity, and simultaneously counteracting the pressure of the first complementary element against the second complementary element by stopping the second complementary element, so that the first complementary element and the second complementary element interlock with each other along their entire length.

This method has the advantage of ensuring proper closure of the reversibly closeable element of the packages and of automating the process of interlocking the first complementary element with the second complementary element. This method could be advantageously implemented with the system and/or machine according to any of the embodiments defined above.

For example, the reversibly closeable interlocking element may comprise a zip closure, and the first and second complementary elements may comprise two straps of the zip closure, comprising a male element and female element, respectively.

For example, the first and second complementary elements may each comprise one, two, three or more interlocking tracks. Preferably, the first complementary element may comprise one, two, three or more tracks that protrude from the edge of the package; the second complementary element may comprise one, two, three or more tracks that form grooves relative to the edge of the package.

For example, the first complementary element may include a series of protrusions suitable for interlocking with corresponding recesses of the second complementary element.

The two straps of the zip closure are hence interlocked at every point if each projecting track or each projecting component of the male element of the zip closure is interlocked with the corresponding groove or recess of the female element of the zip closure, along the entire length of the zip closure.

For example, the reversibly closeable interlocking element may comprise a Velcro closure; the first complementary element may comprise a first strap of the Velcro closure comprising small hook-shaped elements, and the second complementary element may comprise a second strap of the Velcro closure comprising small loop-shaped elements. The two straps of the Velcro closure are hence interlocked at every point if each hook-shaped element of the first strap is inserted into the corresponding loop of the second strap.

Preferably, the first complementary element, for example a male element, is pressed against the second complementary element, while the latter is stopped, so as to resist the pressure applied by the first complementary element and to enable interlocking. However, it is clear that the first complementary element and the second complementary element are interchangeable, therefore the configuration wherein the second, female complementary element is pressed against the first, male complementary element, conveniently stabilized, is also possible.

According to a particularly advantageous configuration, the first complementary element is pressed against the second complementary element in a progressive manner, starting from a first extremity to a second extremity. This means that, if the male complementary element comprises, for example, a plurality of projections, they are interlocked, one after the other in a progressive manner, with the corresponding recesses of the female complementary element, as a result of the external pressure applied on the male complementary element. If the male complementary element comprises, for instance, a plurality of interlocking tracks, they are interlocked, point by point in a progressive manner, with the corresponding plurality of interlocking tracks of the female complementary element. If the first complementary element comprises a Velcro structure, the hook elements of the first strap are inserted into the corresponding loops of the second strap, one after the other in a progressive manner.

According to a preferred configuration, the first complementary element is pressed against the second complementary element, in a progressive manner starting from a first extremity to a second extremity, and, at the same time, the pressure applied by the first complementary element against the second complementary element is counteracted by stopping the second complementary element, so that the latter is not pushed away from its position as a result of the applied pressure. In this way, the interlocking of the two complementary elements is facilitated.

According to an alternative embodiment of the present invention, the reversibly closable interlocking element of the package is closed by sliding it between a fixed pressing element and a fixed counteracting element, so that the first complementary element is progressively pressed against the second complementary element. For example, as the package is held and translated from an initial position to a final position along a direction, it is made to pass through an interstice formed by a fixed pressing element and a fixed counteracting element. The pressing element is configured to apply a pressure on the first complementary element and thus, indirectly, on the second complementary element as they slide through the interstice. The second complementary element is in turn stopped by the counteracting element. In this way, as the package slides from the initial position to the final position, the reversibly closeable interlocking element is always in contact, at one point thereof, with the pressing element, on one side of the package, and the counteracting element, on the other side of the package.

According to a further embodiment of the present invention, a method is provided for producing packages having a reversibly closeable interlocking element, the method comprising the following steps:

a) Introducing a product, preferably granular or viscous, inside the packages;
b) Closing the reversibly closeable interlocking element according to the method described above;
c) Welding the free ends of the packages above the reversibly closeable interlocking element.

This method is particularly advantageous because it prevents, during storage and transport of the packages containing a granular or viscous product, that the parts of the product with finer grain size or viscous components go inside the straps of the reversibly closeable element, thus preventing the later correct use by the end user.

Preferably, during the process of packaging of the products, the granular or viscous product is inserted into the newly formed packages; then the reversibly closable interlocking element is closed, in order to prevent some granular or viscous components from inserting into the complementary elements of the reversibly closable interlocking element; finally, the free ends of the packages, located at the mouth of the package and above the reversibly closable interlocking element, are welded together to ensure a better sealing of the package. Generally, once the package reaches the end user, it is opened by removing the welded upper part in order to access the closeable element, which is opened only later and can be closed again if necessary. For example, the package may be provided with an easy opening to remove the welded upper part.

According to a further embodiment of the present invention, a method is provided for producing packages having a reversibly closeable interlocking element, wherein the reversibly closeable interlocking element is closed while the free ends of the packages above the reversibly closeable interlocking element are welded together.

This configuration has the advantage of optimizing package production times, because it is not necessary to move the package from one station to another to carry out the two operations of welding and closing of the zip closure, but they are carried out simultaneously.

DETAILED DESCRIPTION OF THE INVENTION

The present invention is described below with reference to particular embodiments as shown in the accompanying drawings. However, the present invention is not limited to the particular embodiments described in the following detailed description and shown in the figures, but, on the contrary, the described embodiments merely exemplify different aspects of the present invention, the scope of which is defined in the appended claims.

Further modifications and variations of the present invention will be clear to the person skilled in the art. Therefore, the present description should be considered to include all the modifications and/or variations of the present invention, the scope of which is defined by the appended claims.

For simplicity, identical or corresponding components are indicated in the figures with the same reference numbers.

Figure 1:
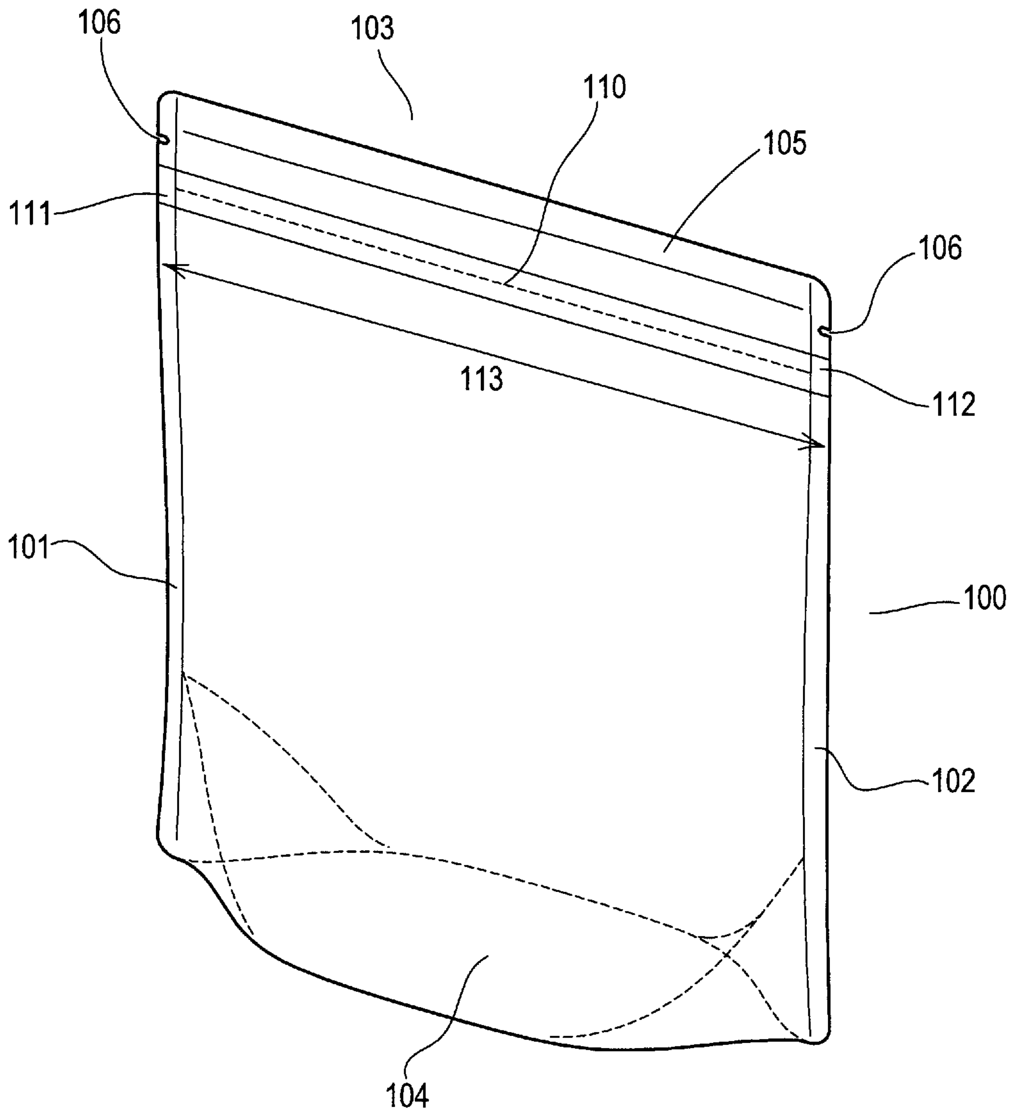
FIG. 1 shows a closeable package that can be obtained according to the present invention, in the closed configuration.

FIG. 1 shows a package 100 made of flexible material and provided with a closeable interlocking element 110, such as those that can be made with the present invention. The package 100 is illustrated in FIG. 1 in the final configuration: the package contains a predetermined amount of product and is closed by means of a sealing weld 105; the closeable interlocking element 110 is closed. For example, said package 100 may be a doypack or a standup package.

In the example shown in FIG. 1, the closeable interlocking element 110 is represented by a zip closure, preferably made of plastic. The zip closure 110 is located at the mouth of the package 103, on the opposite side from the bottom of the package 104. The two ends of the package above the mouth of the package 103 are welded together and form a sealing weld 105, so as to ensure optimal conservation of the product until arrival to the end user. In FIG. 1, it can be seen that the sealing weld 105 has side cut-outs 106, which form an easy opening. The package 100 further comprises two lateral sealing welds 101, 102 to close the sides of the package.

The zip closure 110 extends lengthwise between two extremities 111, 112 that coincide with the two welded side edges of the package. The zip closure 110 includes a first complementary element 120 and a second complementary element 130 suitable for interlocking with each other to ensure sealing of the zip closure. In the examples shown in Figures from 1 to 13, the first complementary element 120 includes a male element and the second complementary element 130 includes a female element. However, it is clear that the first complementary element 120 and the second complementary element 130 are interchangeable, and a configuration with the first, female complementary element 120 and the second, male complementary element 130 could also be possible.

Figure 2:
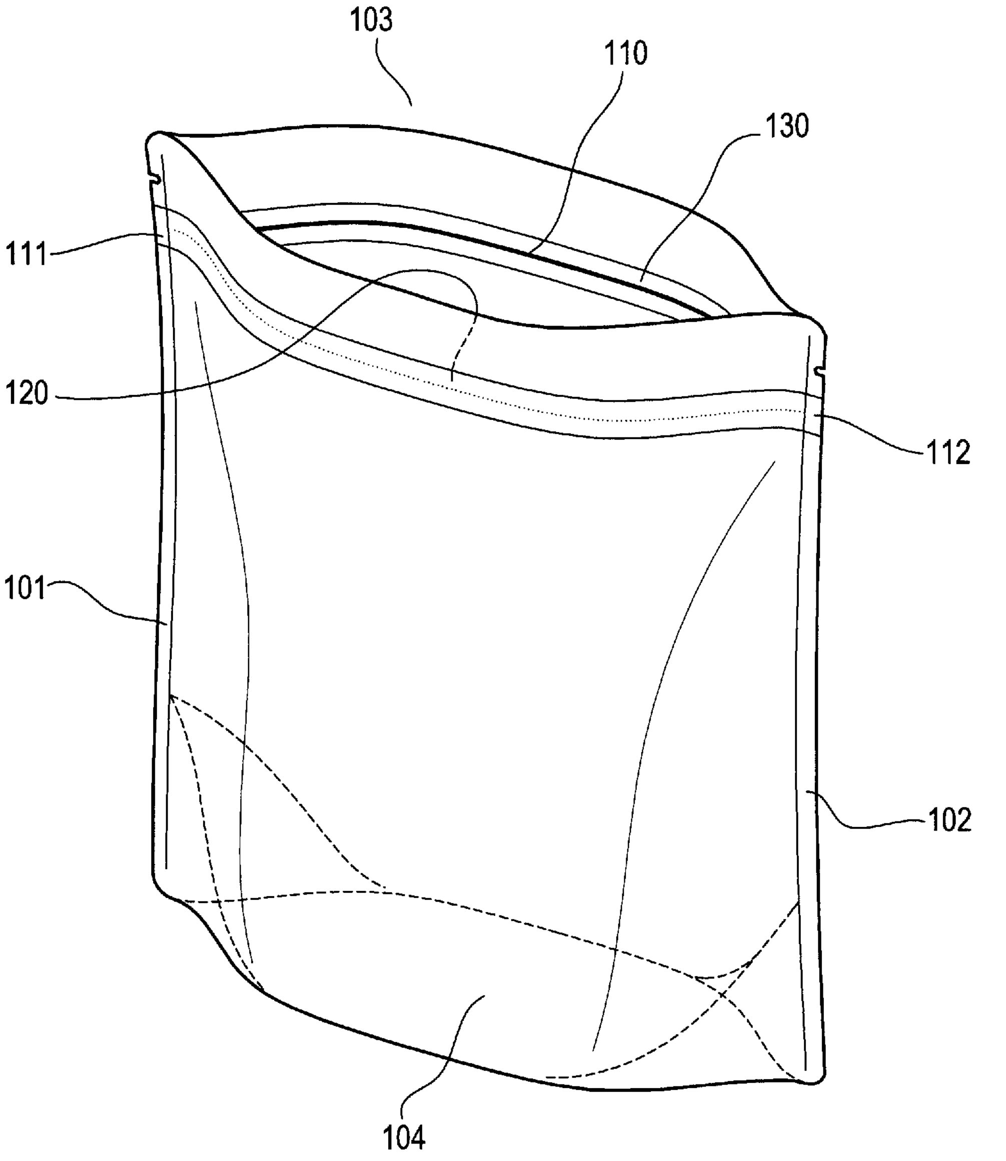
FIG. 2 shows a closeable package that can be obtained according to the present invention, in the open configuration.

In FIG. 2 a package 100 having a partially open zip closure 110 is illustrated. The zip closure 110 comprises a track closing system: the first complementary element 120 comprises a protruding track suitable for interlocking with the corresponding groove of the second complementary element 130. The zip closure 110 is referred to as "partially open" because the first complementary element 120 is interlocked with the second complementary element 130 only in some parts at the lateral extremities 111 and 112. In this way, the package is sufficiently open to allow the introduction of a product into it, but the two complementary elements 120 and 130 are partially interlocked with each other and aligned, so as to facilitate subsequent closing operations.

During the process of producing a package 100 of flexible material according to the present invention, the package 100 is initially in the partially open configuration. At a later stage, a tube or another filling element 210 is conveyed to the top mouth of the package 103 (FIG. 3) and a predetermined amount of product 200 is poured into the package 100 (FIG. 4). Such product 200 may be, for example, a granular or viscous product.

Figure 3:
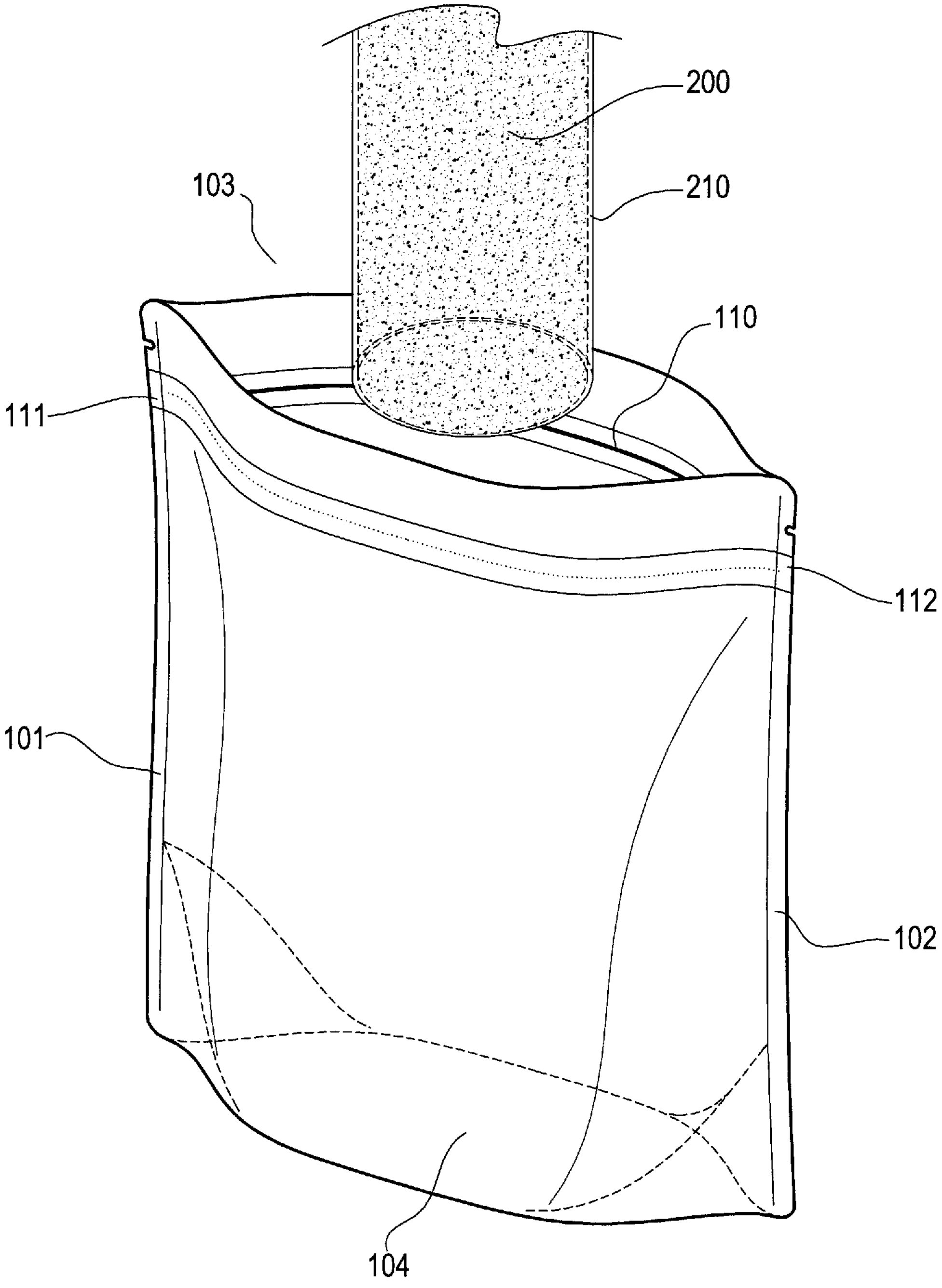
FIG. 3 shows the stage of feeding the product at the mouth of the package, according to one embodiment of the present invention.
Figure 4:
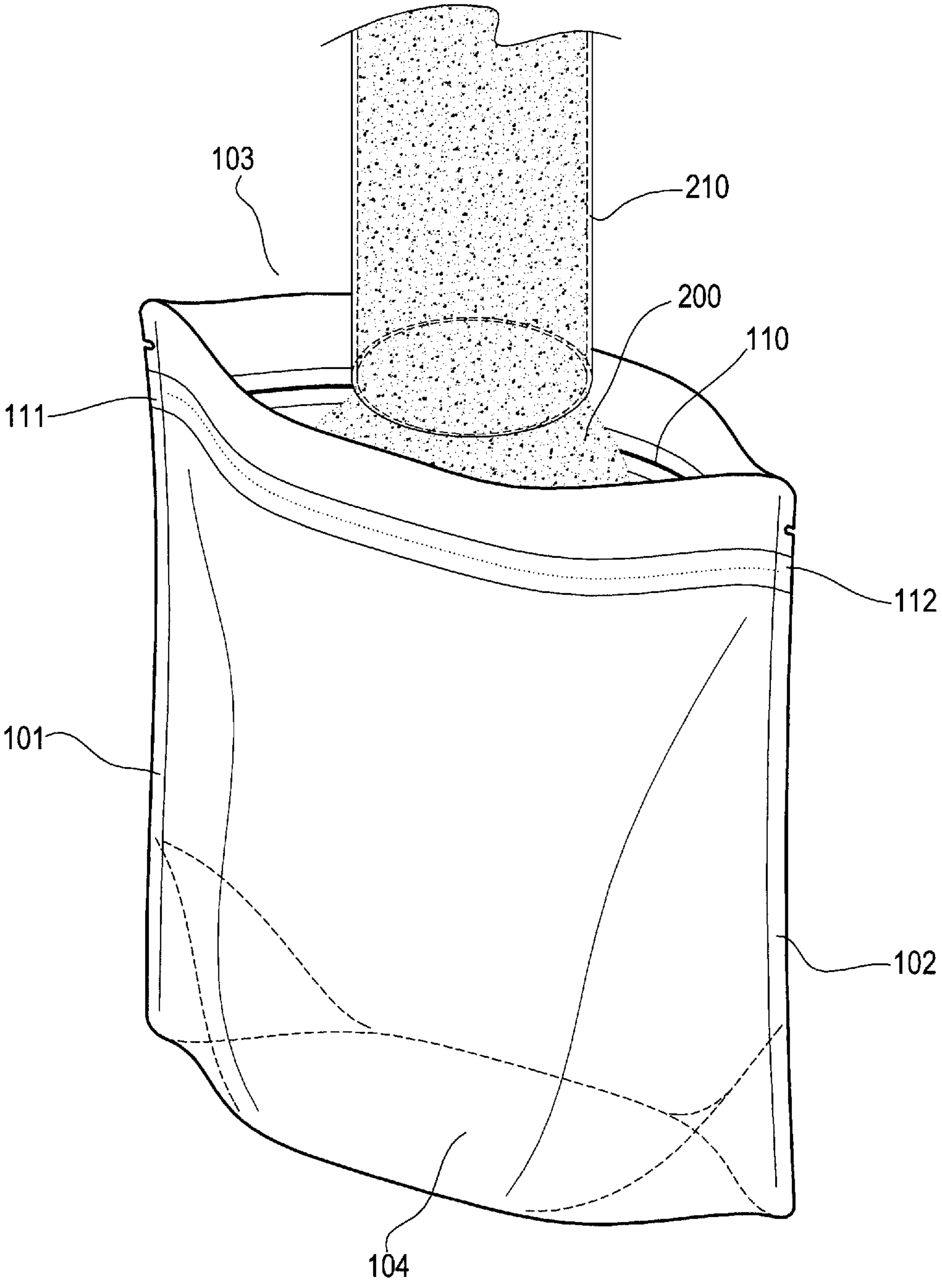
FIG. 4 shows the step of inserting the product into the package, according to an embodiment of the present invention.
Figure 5:
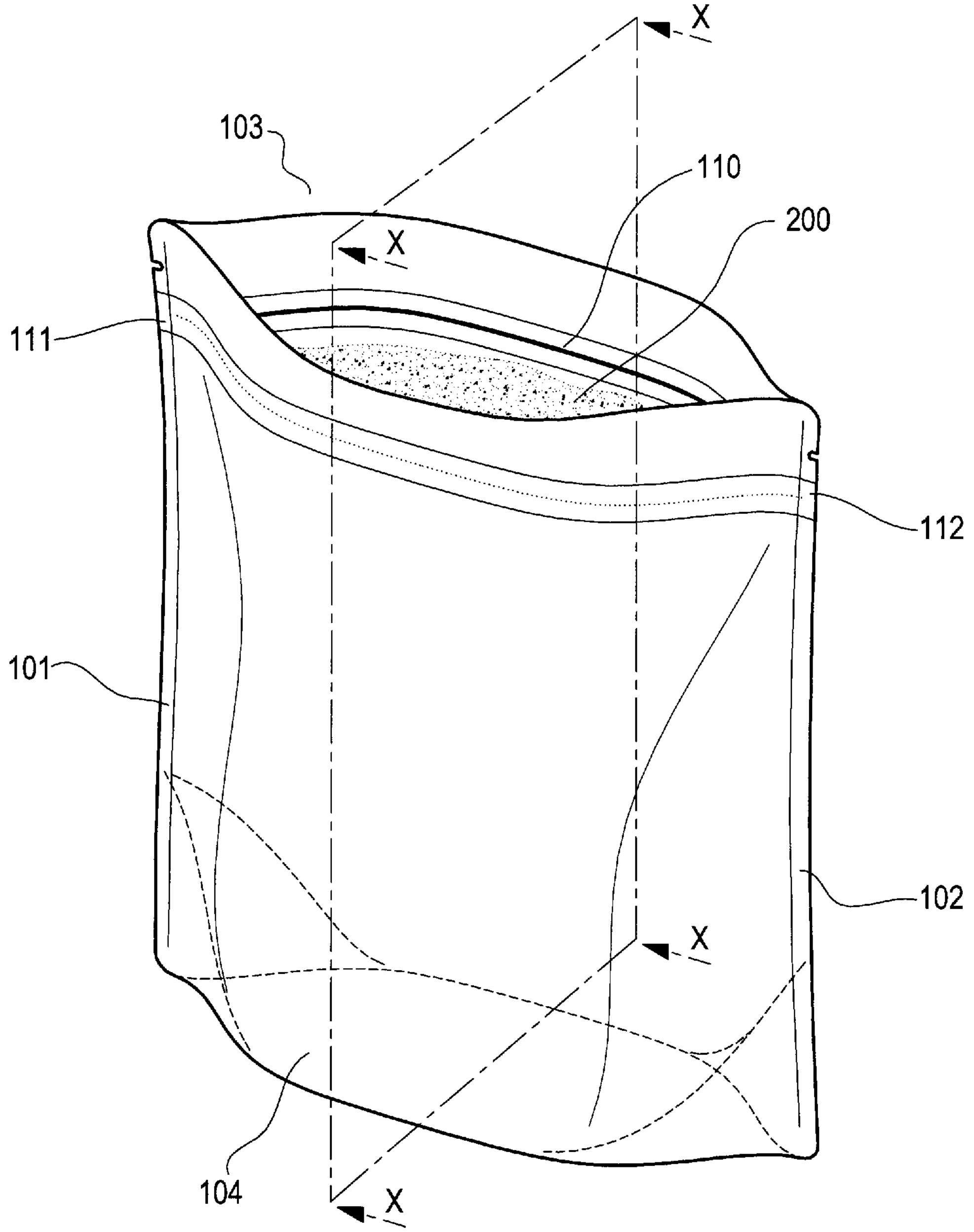
FIG. 5 shows a package containing the product, according to an embodiment of the present invention.
Figure 6:
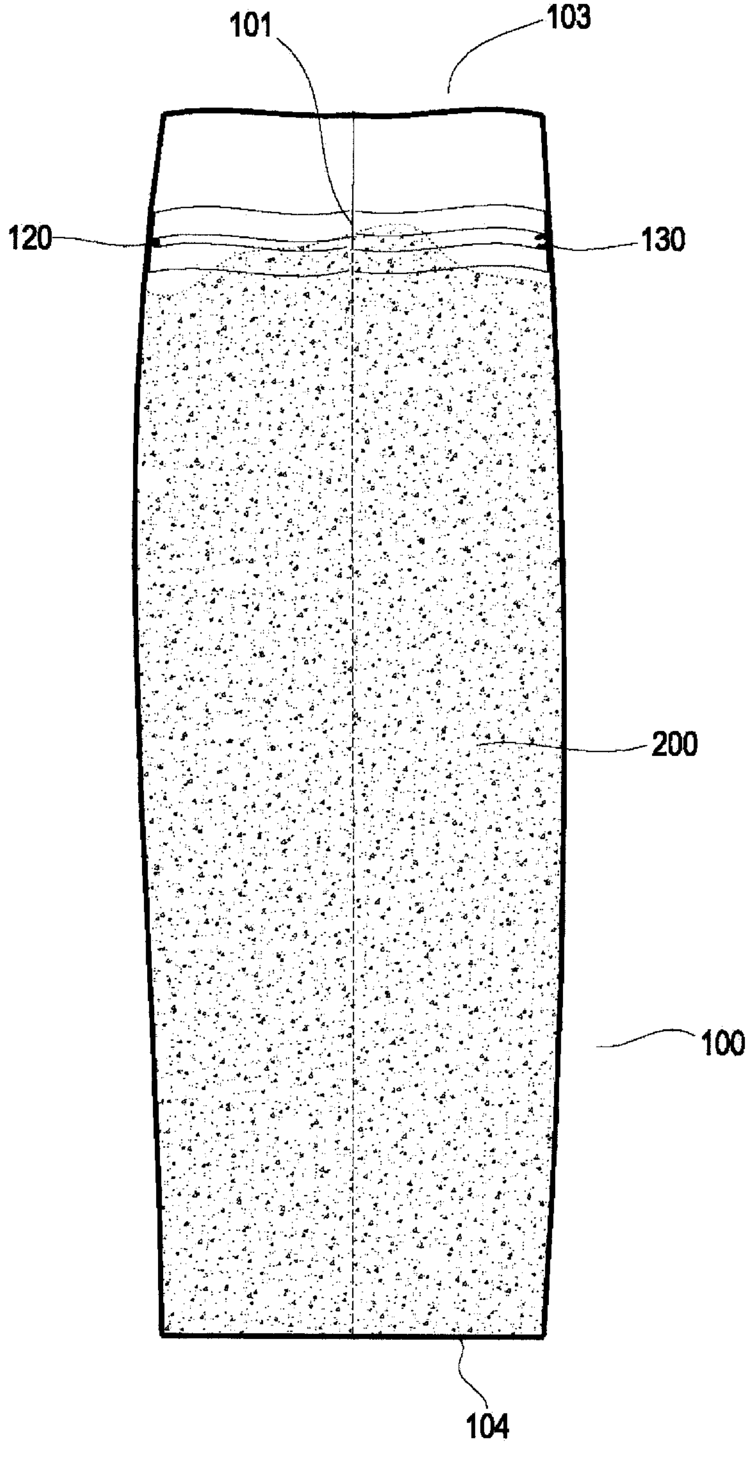
FIG. 6 shows a section of the filled package at the X-X centerline axis illustrated in FIG. 5 of the package, according to an embodiment of the present invention.

The packages 100 shown in FIGS. 3 to 5 contain for instance a granular product. As can be seen in FIG. 5 and more in detail in the section FIGS. 6 and 7, after the product 200 has been inserted into the package, the parts of the product having a finer grain size may get stuck inside the straps of the zip closure 110, preventing perfect adhesion. Even if the two straps of the zip closure 110 have been already partially interlocked with each other before inserting the product, it may happen that, during the later steps of transporting the package 100, some parts of the product with a finer grain size get stuck in some areas of the zip closure 110, preventing it from adhering properly in those points.

Figure 7:
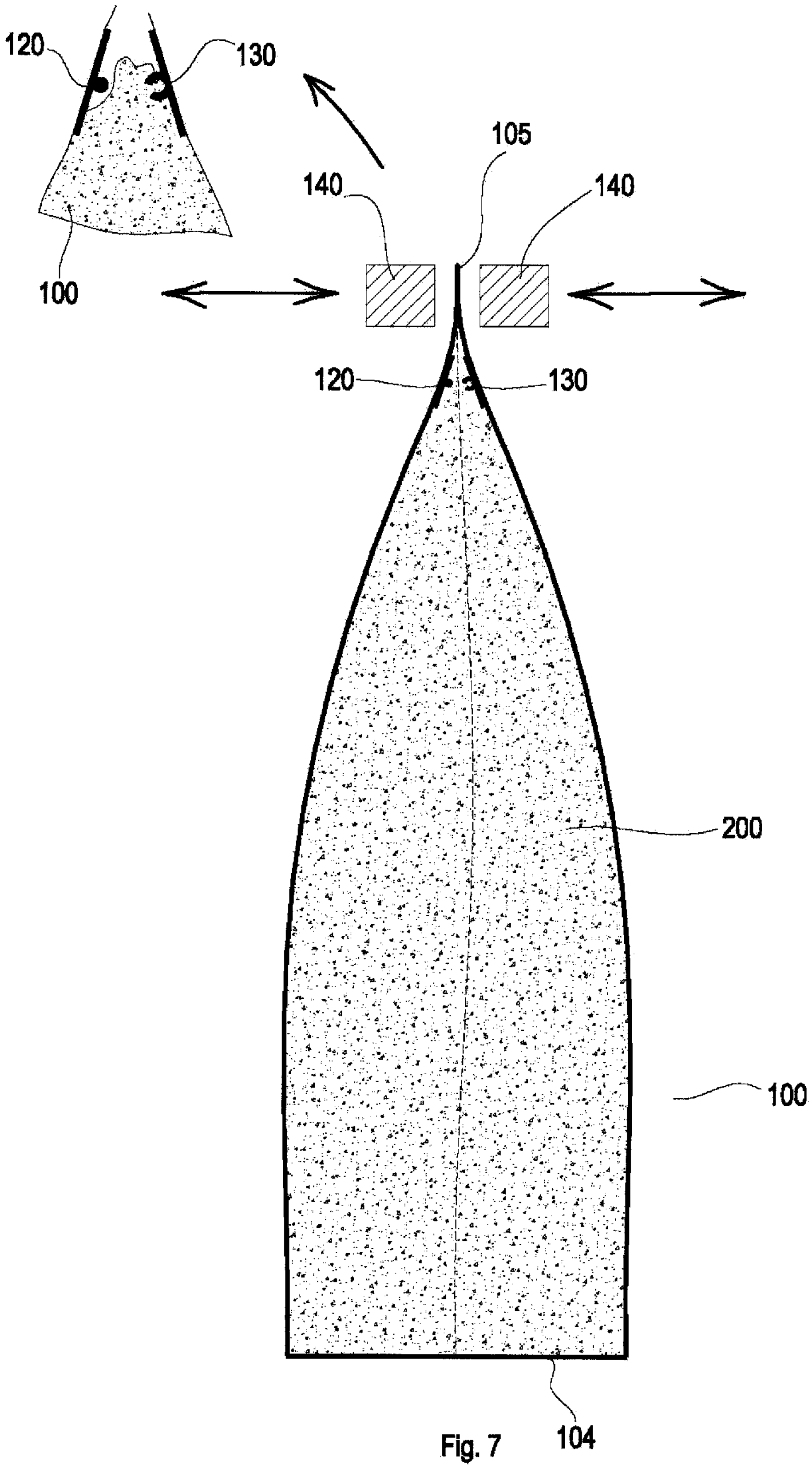
Fig. 7 (Prior Art)
FIG. 7 shows a cross-sectional view of a closeable package in the closed configuration but with the closeable interlocking element partially open, according to the state of the art.

For example, FIG. 7 shows that, if the zip closure 110 has not been fully closed, when the package 100 reaches the welding bars 140 for making the sealing weld 105, the parts of the product 200 with finer grain size are stuck in the complementary elements 120 and 130 of the zip closure 110 and prevent them from interlocking at some points along the length 113.

Figure 8:
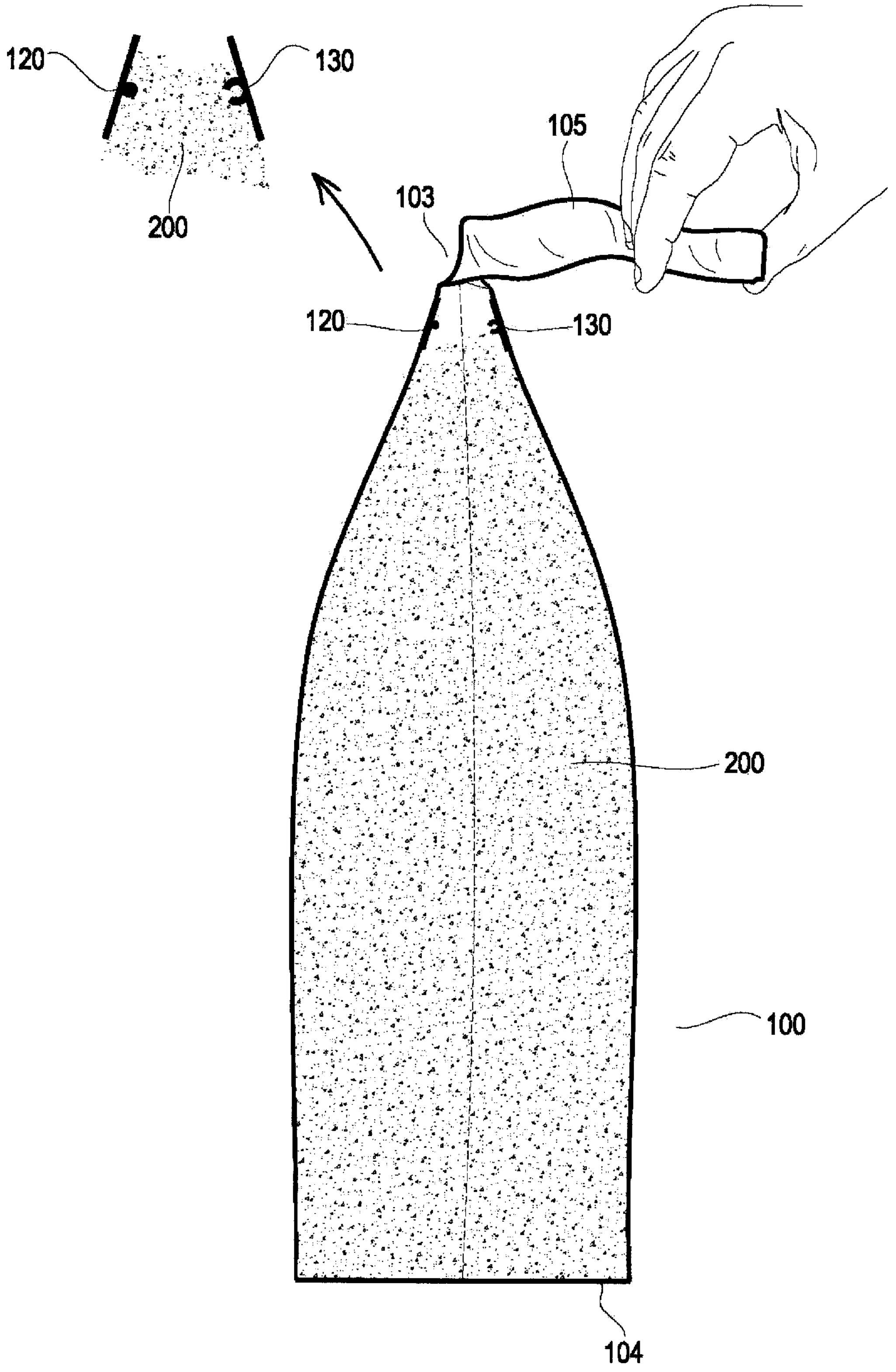
Fig. 8 (Prior Art)
FIG. 8 shows a cross-sectional view of a closeable package according to the state of the art, in which, during storage and transport of the package, the product goes in the closeable interlocking element.

Furthermore, as shown in FIG. 8, if the zip closure 110 has not been fully closed, when the end user opens the package 100 by removing the sealing weld 105, some portions of the product 200 are already stuck in the two complementary elements 120 and 130 of the zip closure and thus make subsequent re-closing by the end user more difficult. A detail of the first, male complementary element 120 and of the second, female complementary element 130 is shown in FIG. 8, wherein it can be seen that some parts of granular product are located between the two complementary elements 120, 130 and prevent them from being interlocked at some points along the length 113 of the zip closure. In order to solve this problem, it is advantageous to close the zip closure 110 just after insertion of the product, by applying an external pressure on the male complementary element 120 or on the female complementary element 130, so as to facilitate the engagement with the corresponding female complementary element 130 or with the corresponding male complementary element 120, respectively. In Figs. from 9 to 13, it is schematically illustrated how to perform these operations by means of a closing system 10 for closeable packages, according to an embodiment of the present invention.

Figure 9:
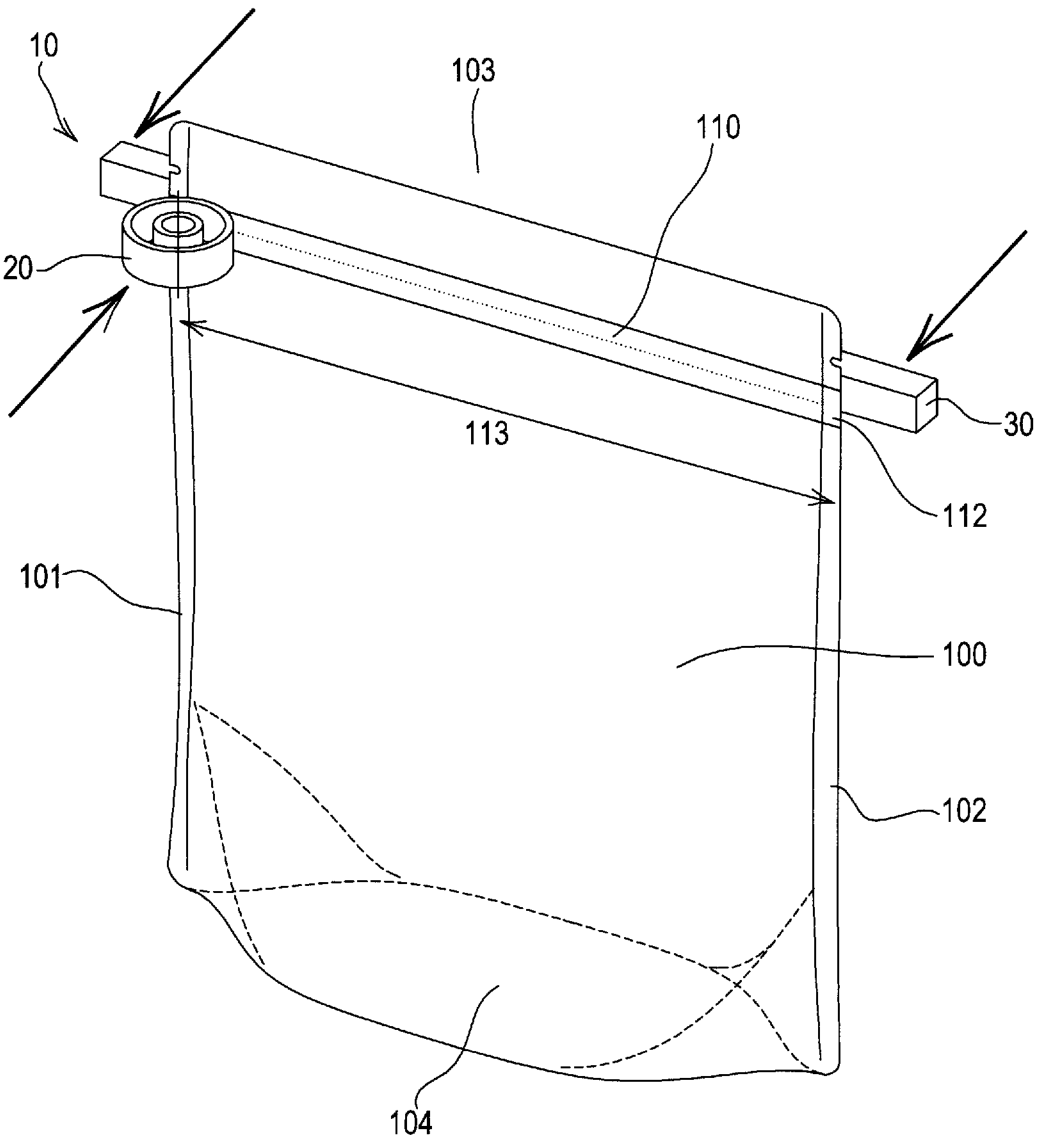
FIG. 9 shows a closing system for packages with a closeable interlocking element, according to an embodiment of the present invention.

The closing system 10 shown in FIG. 9 comprises a pressing element 20 and a counteracting element 30 placed outside the mouth of the package 103, on opposite sides, so that, as they move in a direction perpendicular to the package 100 and move close to or away from each other, they can respectively grip or release the package. Even if the pressing element 20 and the counteracting element 30 are positioned so that they can grip the package 100 and release it once the closing operations have been performed, the package 100 is preferably held by additional holding means (not shown in FIG. 9). The holding means may be, for example, configured to transport the package 100 through the different working stations of the packaging machine and then to the station equipped with the closing system 10.

Figure 10:
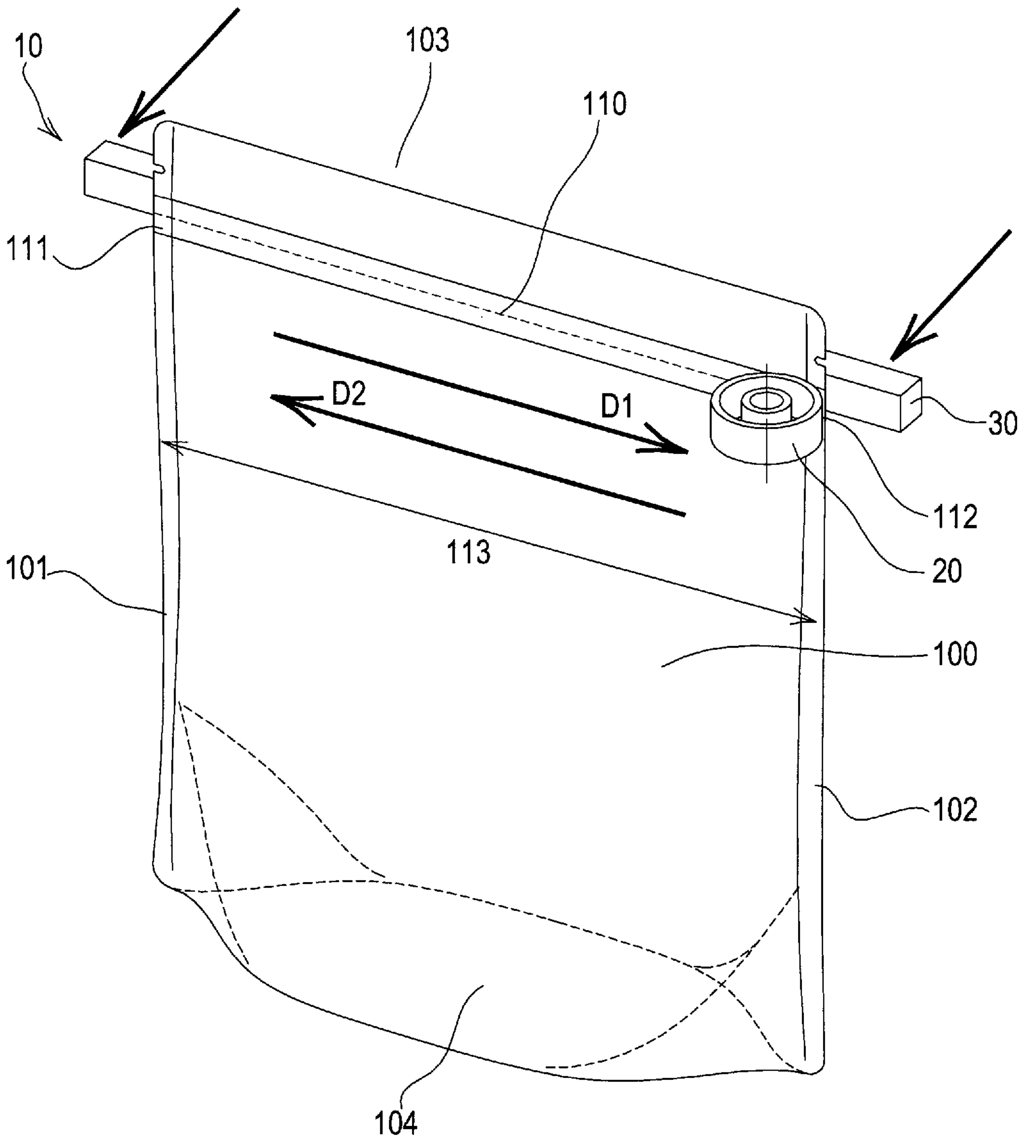
FIG. 10 shows a closing system for packages with a closeable interlocking element during a using step, according to an embodiment of the present invention.
Figure 11:
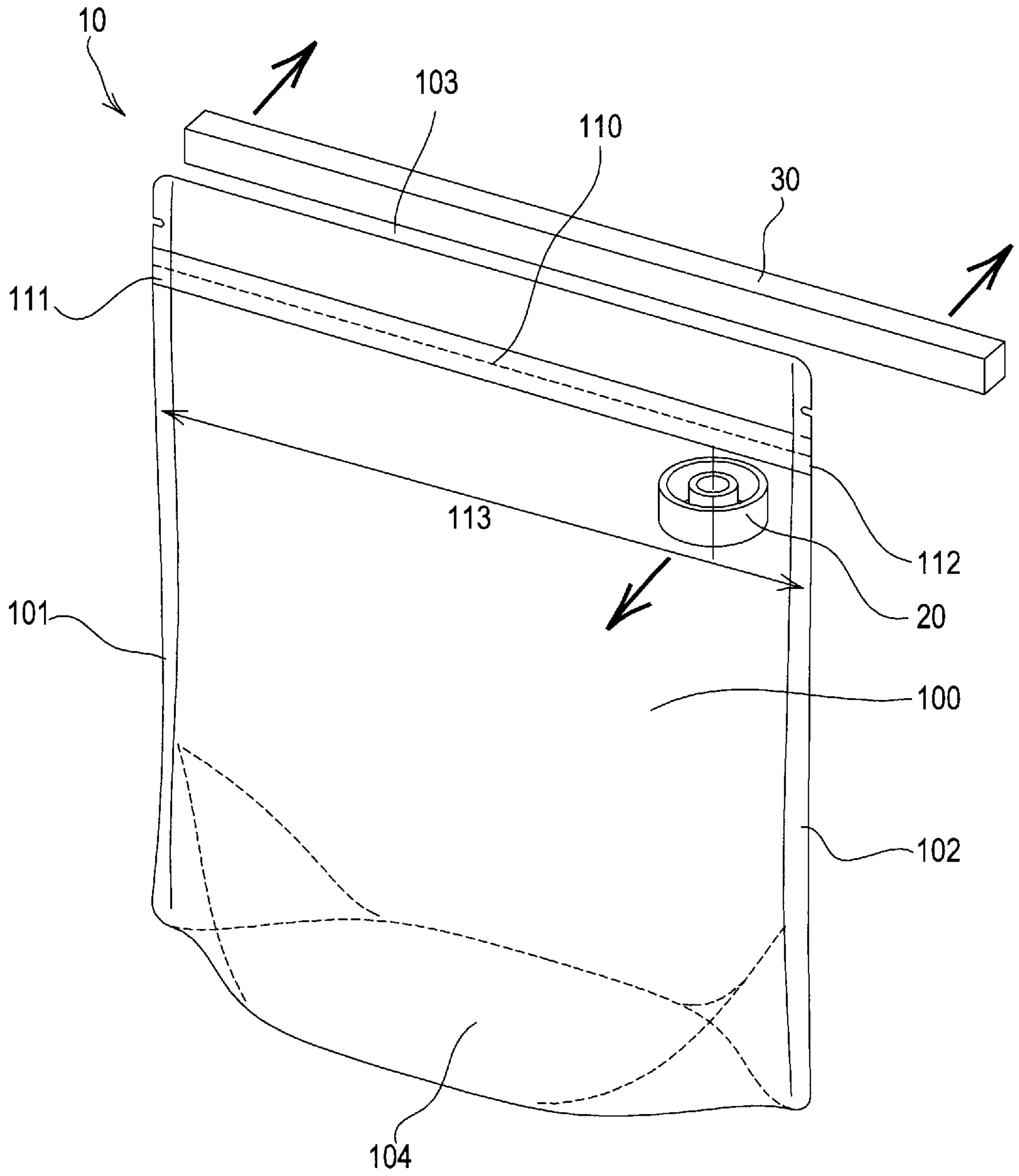
FIG. 11 shows a closing system for packages with a closeable interlocking element during a using step, according to an embodiment of the present invention.

The pressing element 20 may be configured to perform a roto-translation motion, for example it may include a roller, a wheel, or a ball bearing, or it may be configured to perform a pure translation motion, as in the case of a bar or a skid. In particular, a ball bearing is illustrated in FIGS. 9-11. The counteracting element 30 may be, for example, a counteracting bar.

In FIG. 9, it is shown that, when the two upper ends of the mouth of the package 103 are in contact with each other, the ball bearing or pressing element 20 is translated in the direction perpendicular to the package, towards it, and is placed in contact with the zip closure 110. At the same time, also the counteracting bar 30 is translated in the direction perpendicular to the package, towards it, and is placed in contact with the zip closure 110, on the opposite side with respect to the ball bearing 20.

It is clear that, even if it is described that the ball bearing 20 and the counteracting bar 30 reach the package at the same time, it is also possible to implement a configuration wherein, as a first step, the counteracting bar 30 is moved close to one side of the package 100 and, at a later stage, the ball bearing 20 is moved close to the opposite side of the package, or, conversely, the ball bearing 20 may be first moved and the counteracting bar 30 later. For example, the ball bearing 20 may be placed on the outside of the package on the side corresponding to the male complementary element 120 and the counteracting bar 30 may be placed outside the package on the side corresponding to the female complementary element 130. Alternatively, it is possible to place the ball bearing 20 outside the package on the side corresponding to the female complementary element 130 and the counteracting bar 30 on the side corresponding to the male complementary element 120.

The closing system 10 can be advantageously employed when the two complementary male 120 and female 130 elements are properly aligned with each other, so as to facilitate the sliding of the ball bearing 20. FIG. 9 shows that the ball bearing 20 and the counteracting bar 30 are moved towards the corresponding complementary elements 120 and 130 to be closed, when these are already partially inserted into each other, that is, when the zip closure 110 is partially closed. Therefore, the closing system 10 has the function of completing and perfecting the interlocking between the two complementary male 120 and female elements 130, even where small granular parts are present and/or where the two complementary elements are not completely interlocked. However, it is clear that, in order to use the closing system 10 according to the present invention, it is sufficient for the two complementary elements to be aligned with each other, even without the zip closure 110 having been previously closed, either partially or completely.

As shown in detail in FIG. 10, the ball bearing 20 is then slid along the entire length of the zip closure 113 from one extremity 111 to the other extremity 112 of the package 100 along the direction D1 parallel to the package 100, so that, during this translation, it presses against the male complementary element 120 and presses it against the female complementary element 130. The ball bearing 20 may be supported and constrained to a linear movement for instance by means of a pneumatic or electric actuator. The counteracting bar 30, during this sliding step, remains stationary and stops the female complementary element 130, when the latter is pushed by the male complementary element 120, which is in turn pressed by the ball bearing 20, so that the female complementary element 130 applies a pressure equal and opposite to that applied by the male complementary element 120 due to the effect of the ball bearing 20. In this way, it is ensured that the two complementary elements 120 and 130 are interlocked with each other along the entire length of the package 113, starting from a first edge of the package provided with the lateral sealing weld 101 to the second edge of the package provided with the lateral sealing weld 102. Basically, the use of the ball bearing 20 simulates the action of the consumer's fingers on the zip closure 110 of the package 100 during the reclosing operation, after an initial use of the product.

As shown in FIG. 11, upon completion of the closure of the package 100, the ball bearing 20 and the counteracting bar 30 are moved away from each other in a direction perpendicular to the package 100, they release the newly closed package 100 and are ready to receive a new package 100.

At the end of a first closing operation, the ball bearing 20 is no longer in its initial position near the extremity 111 of the zip closure 110, but it is in its position near the extremity 112 of the zip closure 110. When the closing system 10 receives a new package 100, the steps shown in FIGS. 9 and 10 are repeated with a translation of the ball bearing 20 along a direction D2 opposite to the previous direction. In this way, the process of closing the packages is optimized, because it is not necessary to bring the ball bearing 20 back to its initial position in order to proceed with closing a new package.

Although reference has been made to an initial position near the extremity 111 of the zip closure 110, it is clear that the two extremities are entirely symmetrical and that the initial position could also be near the extremity 112 of the zip closure 110.

It is also clear that it is also possible to design the closing system 10 so that the zip closure 110 of a given package 100 is closed along both directions D1 and D2 by means of the closing system 10: a first time when the ball bearing 20 is translated from the extremity 111 to the extremity 112 and a second time when the ball bearing 20 is translated from the extremity 112 to the extremity 111. In this case, the ball bearing 20, after translating along the direction D1 the first time, is not moved away from the package 100, but is left in contact with it and is translated along the direction D2, so that it presses again the complementary element 120 against the complementary element 130.

Moreover, it is also possible to design the closing system 10 in such a way that the ball bearing 20, after being translated a first time from the extremity 111 to the extremity 112 and having been used to close the zip closure 110, is moved away from the package 100 and is brought back to the initial position 111, before receiving a new closeable package 100.

Figure 12:
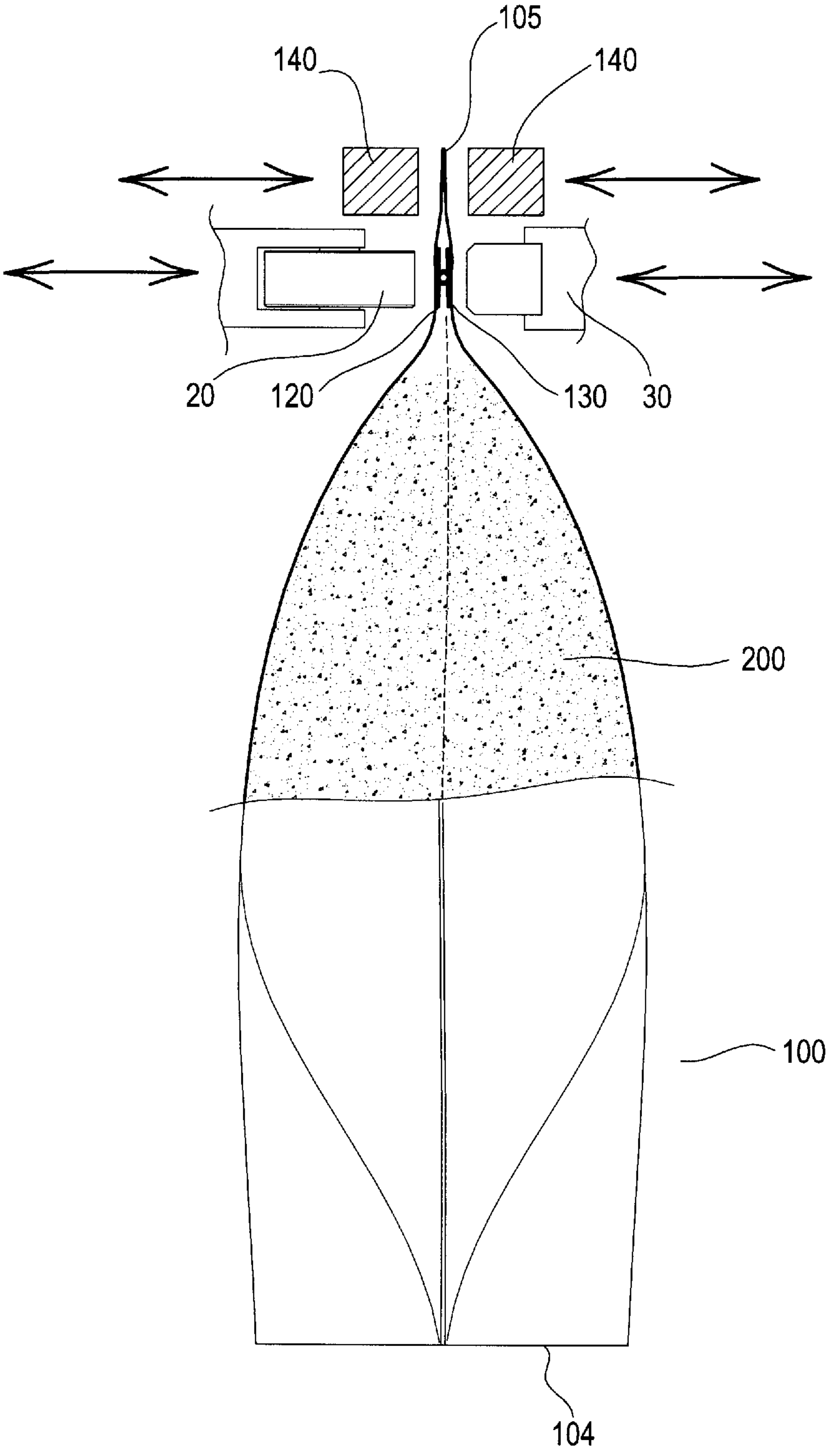
FIG. 12 shows a closing system for packages with a closeable interlocking element placed at a welding station, according to an embodiment of the present invention.

The closing system 10 may be placed in a packaging machine at a welding station. For example, as shown in FIG. 12, the closing system 10 may be placed below the welding bars 140, so that the welding bars 140 are located at the upper edge of the package 103 and the closing system 10 is located at the zip closure 110. In this configuration, the welding bars 140 and the closing system 10 may operate simultaneously, in such a way that, as the welding bars 140 reach the upper edge of the package 103 and weld it, the closing system 10 approaches the zip closure 110 and closes it, as described above. For example, the welding bars 140 and the closing system 10 may be configured so that, one welding bar 140 is positioned above the ball bearing 20, on one side of the package 100, and one welding bar 140 is positioned above the counteracting bar 30, on the other side of the package 100. The two welding bars 140 and the corresponding elements of the closing system 10 placed below may be simultaneously moved close to and/or moved away from the package 100, during various stages of use, for example by making a movement along a circumferential arc.

Alternatively, it is possible to design a packaging machine in such a way that, upon completion of the closing operations described above, the package 100 is moved to a welding station where the two free ends of the package 100, located above the zip closure 110, are welded to each other by means of welding bars 140.

Finally, it is also possible to design a packaging machine in which the welding station is placed upstream of the closing system. In this case, the two ends of the upper edge of the package 103 are first welded together and then the package 100 with the sealing weld 105 is moved to a station equipped with the closing system 10. However, in this configuration, as explained above, there is a risk that, during transport and storage, part of the product will go in the incompletely closed zip closure 110.

Figure 13:
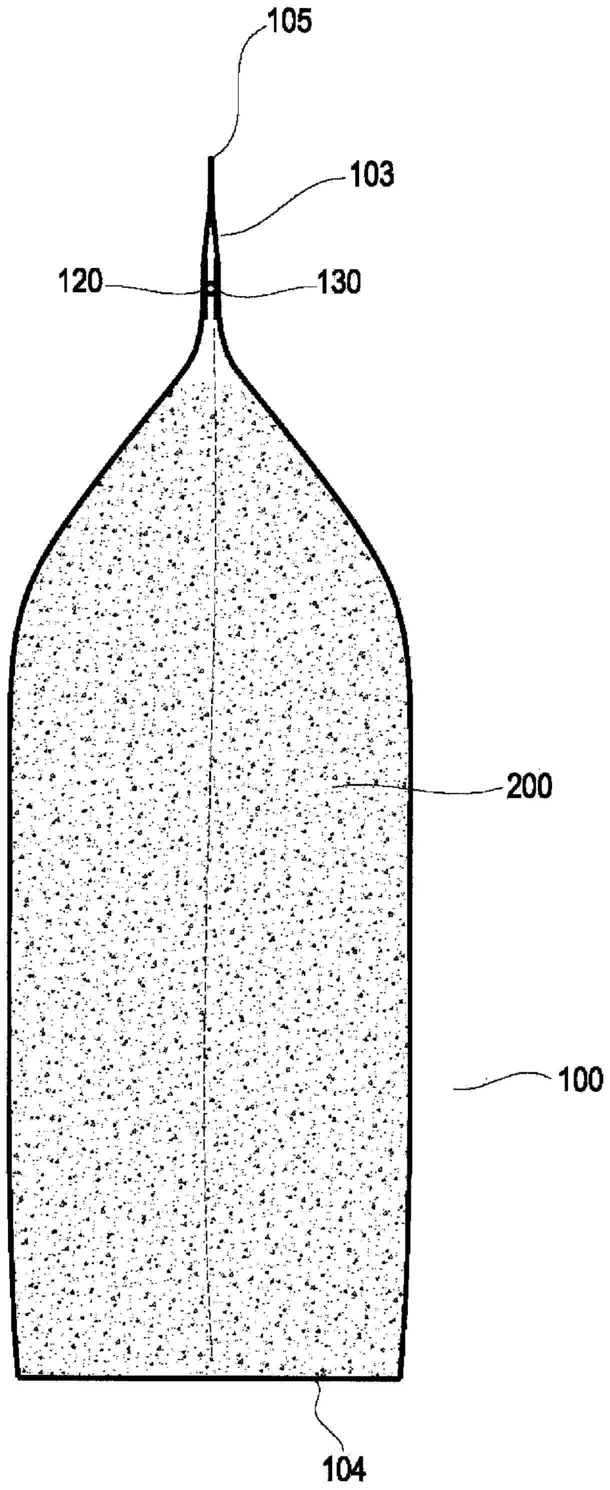
FIG. 13 shows a cross-sectional view of a closeable package in the closed and welded configuration, according to an embodiment of the present invention.

FIG. 13 shows the closeable package 100 with the closed zip closure 110 and with the two upper ends welded together to form the sealing weld 105, at the end of the packaging process.

Figure 14:
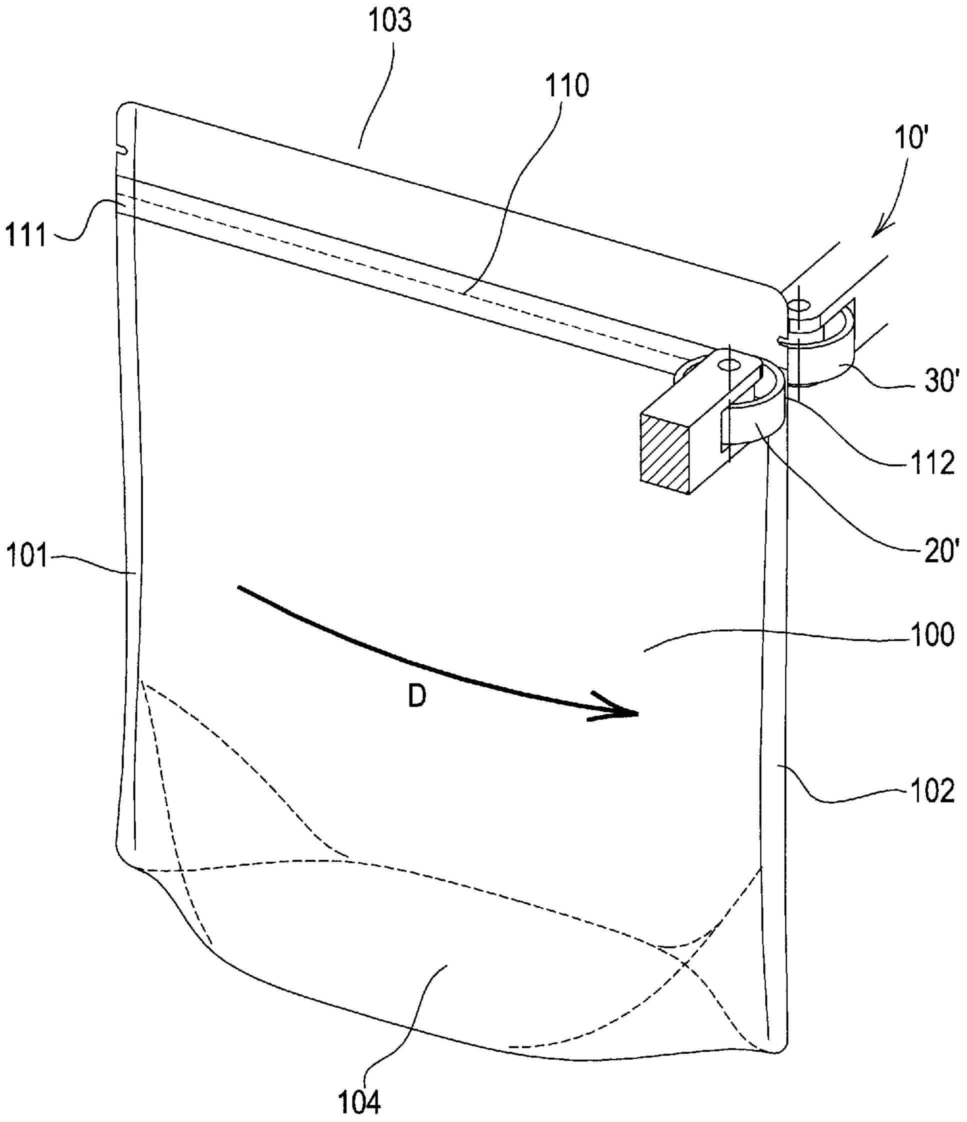
FIG. 14 shows a closing system for packages with a closeable interlocking element, according to an alternative embodiment of the present invention.

In FIG. 14 a closing system 10' for packages having a reversibly closable interlocking element 110 is shown, according to an alternative embodiment of the present invention. As described above, the reversibly closable interlocking element 110 may comprise, for example, a zip closure 110. The alternative closing system 10' comprises a pressing element 20' and a counteracting element 30' that are fixed and is configured in such a way that the package 100 can move relative to them along a direction D. For example, the pressing element 20' and counteracting element 30' shown in FIG. 14 include a wheel attached to a pin.

The pressing element 20' and the counteracting element 30' are configured to be initially placed in contact with the outer surface of the package 100, at an equal height of the zip closure 110 and on opposite sides of the package 100, so as to form a gap within which the package 100 is free to slide. For example, the pressing element 20' and the counteracting element 30' may be placed at the extremity 112 of the package, as shown in FIG. 14. However, it is clear that the two extremities are symmetrical and that the pressing element 20' and the counteracting element 30' could also be placed at the extremity 111 of the package. Moreover, they could be placed at any point along the length of the package 113.

After this initial positioning step, the pressing element 20' and the counteracting element 30' are no longer moved. The package 100 is then translated along the direction D from the initial position, with the closing system 10' located at the extremity 112, to the final position, with the closing system 10' located at the extremity 111. For example, the package may be held and translated by means of holding means (not shown in the figure). During this sliding step, the package 100 passes through a gap formed by the fixed pressing element 20' and the fixed counteracting element 30' and remains in contact therewith, so that the pressing element 20' progressively applies a pressure on the first complementary element 120 and then, indirectly, on the second complementary element 130. In other words, the pressing element 20' initially applies a pressure on the first complementary element 120 at the extremity 112 and, as the package 100 slides in the gap, the pressing element 20' presses on different portions of the zip closure 110, until it presses on the portion at the extremity 111. While the pressing element 20' presses on the first complementary element 120 and thus, indirectly, on the second complementary element 130, the latter is stopped by the counteracting element 30'. In this way, as the package 100 slides from the initial position to the final position, the zip closure 110 is closed. Although it has been described that one package is closed at a time, it is clear that the closing system could be configured to hold and close two, three, four or more packages side-by-side and to include two, three, four or more pressing elements located at said packages, each capable of sliding along a length equal to the length of a single package and of closing the corresponding package. Preferably, the two, three, four or more pressing elements may be attached to the same linear actuator.

Furthermore, even if it has been shown that the pressing element comprises only one rolling element, it is clear that it could also comprise a plurality of rolling elements, for example two, three, four or more wheels, or two, three, four or more ball bearings, or two, three, four or more casters, capable of closing a package by acting on one of the complementary elements one after the other in succession.

While the invention has been described with respect to preferred physical embodiments realized in accordance therewith, it will be apparent to those skilled in the art that various modifications, variations and improvements of the present invention can be made in light of the teachings above and within the scope of the appended claims, without departing from the spirit and scope of the invention.

Furthermore, those areas that are considered to be familiar to the person skilled in the art have not been described herein, in order to not unnecessarily obscure the described invention. Accordingly, it has to be understood that the invention should not be limited by the specific illustrative embodiments, but only by the scope of the appended claims.

For example, the operation of the various stations of the packaging machines has not been described in detail, because it is considered to be known to the person skilled in the art.

LIST OF REFERENCES

10: closing system
10': closing system
20: pressing element
20': fixed pressing element
30: counteracting element
30': fixed counteracting element
100: package
101, 102: lateral sealing welds of the package
103: package mouth
104: package bottom
105: sealing weld
106: lateral cuts for easy opening
110: reversibly closeable interlocking element
111, 112: extremity of the reversibly closeable interlocking element
113: length of the zip closure
120: first complementary element
130: second complementary element
140: welding bars
200: product
210: filling element
D: sliding direction of the package
D1, D2: sliding directions

What is claimed is:

1. A closing system to close in an automated way with an automated packaging machine at least one package provided with a reversibly closeable interlocking element comprising:

a first complementary element and a second complementary element and having a length that extends between a first extremity and a second extremity, said closing system comprising a pressing means for pressing and a counteracting means for counteracting, wherein said pressing means is configured to press said first complementary element against said second complementary element, in a progressive way starting from the first extremity to the second extremity, wherein said pressing means is configured to translate entirely along the length both along one direction and along an opposite direction, said counteracting means is configured to counteract a pressure of said first complementary element against said second complementary element, by stopping said second complementary element when said pressing means presses said first complementary element against said second complementary element, wherein said counteracting means is at least as long as the length of the reversibly closeable interlocking element, and in such a way that said first complementary element and said second complementary element interlock the one with the other along an entire length of the first and second complementary elements.

2. The closing system according to claim 1, wherein said pressing means is configured to press said first complementary element against said second complementary element, by sliding from said first extremity to said second extremity.

3. The closing system according to claim 1, wherein said pressing means is configured to translate along the entire length both along a direction and along the opposite direction, while rotating.

4. The closing system according to claim 1, wherein said pressing means comprises a ball bearing.

5. The closing system according to claim 1, wherein said counteracting means and said pressing means are placed at opposite external sides with respect to an opening of the package where said reversibly closeable interlocking element is placed.

6. A machine for producing packages provided with a reversibly closeable interlocking element, comprising a closing system according to claim 1.

7. The machine according to claim 6, wherein said closing system is placed at a welding station.

8. The closing system according to claim 1, wherein:

said first complementary element comprises a projecting component; and said second complementary element comprises a groove, whereby a zip closure is capable of being formed.

9. The closing system according to claim 1, wherein:

said first complementary element comprises a hook-shaped element; and said second complementary element comprises a loop-shaped element, whereby a hook and loop closure is capable of being formed.

10. A method for closing, in an automated way with an automated packaging machine, at least one package provided with a reversibly closeable interlocking element comprising a first complementary element and a second complementary element and having a length that extends between a first extremity and a second extremity comprising the steps of:

pressing said first complementary element against said second complementary element, in a progressive way starting from said first extremity to said second extremity, by translating a pressing element entirely along the length both along one direction and along an opposite direction, and simultaneously counteracting the pressure of said first complementary element against said second complementary element, by stopping said second complementary element by a counteracting bar which is at least as long as the length of the reversibly closeable interlocking element, and in such a way that said first complementary element and said second complementary element interlock with each other along an entire length of said first complementary element and said second complementary element.

11. A method for producing packages provided with a reversibly closeable interlocking element, comprising the following steps:

a) introducing a product inside said packages;

b) closing said reversibly closeable interlocking element according to the method of claim 10;

c) welding the free extremities of said packages above said reversibly closeable interlocking element.

12. The method according to claim 11, wherein said step b) is carried out simultaneously to said step c).

13. A method according to claim 11 wherein the product is granular or viscous.

14. A method for closing in an automated way with an automated packaging machine a package having a mouth and opposing complementary reversibly closeable interlocking elements extending from one end of the mouth of the package to another end of the mouth of the package for containing a granular product comprising the steps of:

opening the mouth of the package and the opposing complementary reversibly closeable interlocking elements;

filling the package with the granular product through the mouth and past the opposing complementary reversibly closeable interlocking elements;

placing a counteracting element outside of the package adjacent one of the opposing complementary reversibly closeable interlocking elements, wherein the counteracting element comprises a bar extending along an entire length of the opposing complementary reversibly closeable interlocking elements;

placing a pressing element outside of the package adjacent another one of the opposing complementary reversibly closeable interlocking elements, wherein the pressing element comprises a roller;

moving the counteracting element and the pressing element closer together holding the package;

moving the pressing element relative to the package from the one end of the mouth of the package to the other end of the mouth of the package over the opposing complementary reversibly closeable interlocking elements, wherein the opposing complementary reversibly closeable interlocking elements are interlocked together;

welding the mouth of the package so that the interlocked opposing complementary reversibly closeable interlocking elements are positioned between the welded mouth and the granular product contained in the package; and moving the counteracting element and the pressing element away from each other releasing the package, whereby the granular product is prevented from going inside the opposing complementary reversibly closeable interlocking elements during storage and transport of the package.

* * * * *